Sept. 12, 1933.  A. H. TROTTER  1,926,217
FASTENING DEVICE
Original Filed Sept. 15, 1925
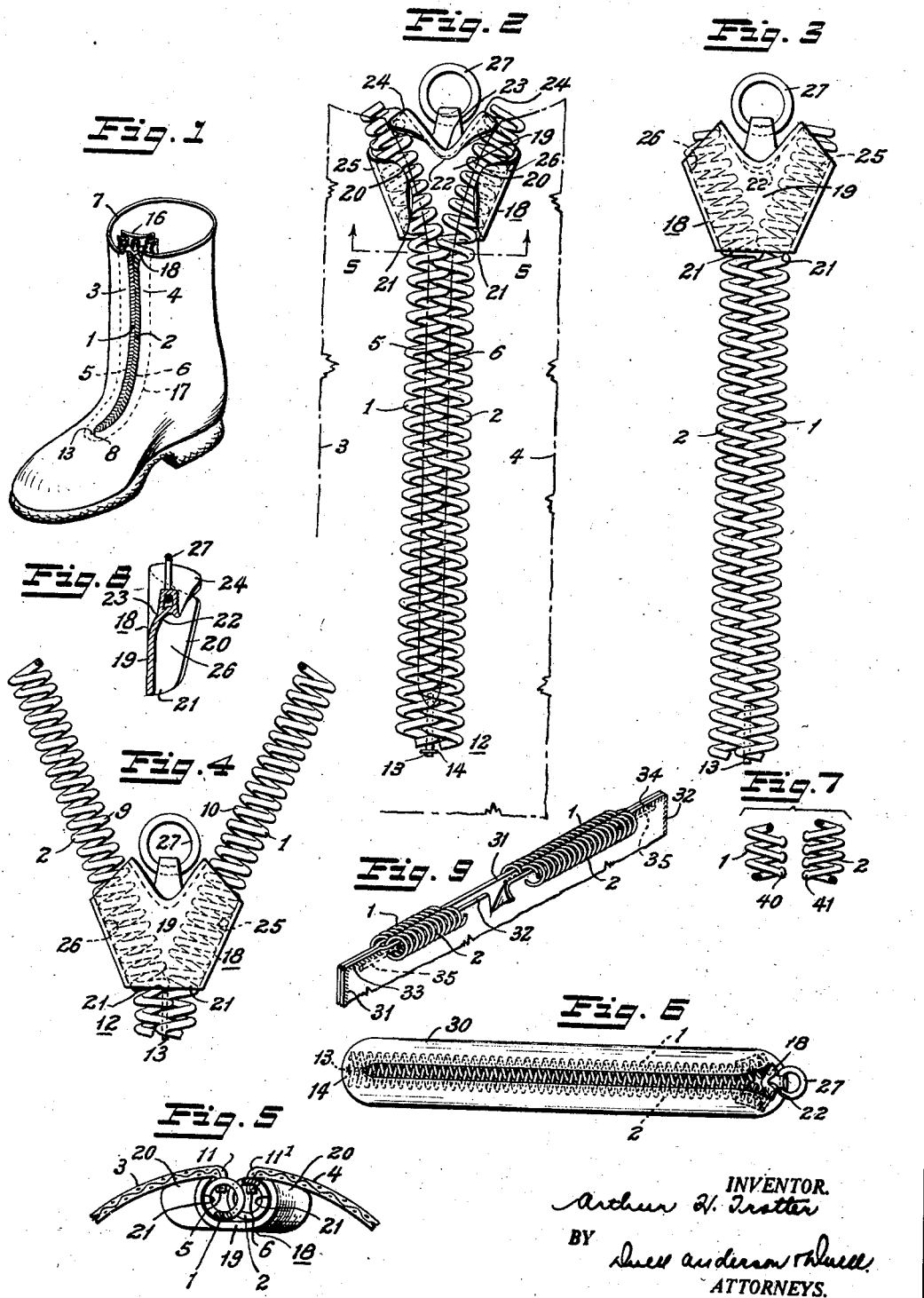
INVENTOR.
Arthur H. Trotter
BY
Duell Anderson & Duell
ATTORNEYS.

Patented Sept. 12, 1933

1,926,217

UNITED STATES PATENT OFFICE 1,926,217

FASTENING DEVICE

Arthur Halsey Trotter, Syracuse, N. Y., assignor to Robert B. Burns, Buck Hill Falls, Pa.

Application September 15, 1925, Serial No. 56,448. Renewed January 21, 1933

10 Claims. (Cl. 24—205)

This invention relates to fasteners adapted more especially to hold closed an opening, slit or mouth of a relatively small article, and to permit of the opening being readily opened and closed by simple manipulation. In respect to its more specific features the invention relates to fasteners of resilient structure adapted to bend and thereby conform or accommodate itself to articles of curved or complex shape, though it is to be understood that the fastener is adapted to occupy substantially straight lines.

One of the objects of the invention is the provision of a simple and practical fastener of the character referred to which may be attached in a simple manner, to flexible article and wherewith openings slits, or mouths, in the articles may be held closed and quickly and conveniently opened. The closure opening in the cloth upper of a shoe, such as a galosh, and a mouth of a tobacco pouch are those for which the fastener is well adapted, although it is to be understood that the fastener is applicable to other articles.

Another object of the invention is the provision of a simple fastener of the character referred to which is relatively inexpensive to manufacture, is rugged in use, and in which the body material of the article to which it is applied may be utilized to augment the fastening tension, thereby rendering the fastener efficiently utilizable with various body materials without danger of unduly impairing the material.

Another object of the invention is the provision of a practical fastener of the character referred to, the parts of which are not easily distorted, which is durable in use, which may be of considerable length and in which the cooperative fastening members may be engaged with each other in holding relation by transversely pressing them together at different points in their lengths.

Another object of the invention is the provision of a simple and efficient fastener of the character referred to in which the cooperative members, when in fastening relation, may not readily be grasped for parting them, and in which but a small portion of the fastener is presented exteriorly of the article to which it is applied.

Another object of the invention is the provision of a simple and practical fastener of the character referred to, the cooperative members of which are adapted readily to be brought into and parted from operative holding engagement by direct transverse pressure, but in which such parting movement is relatively difficult to effect as compared with the effecting of the same by parting the members progressively along their lengths.

Other objects of the invention will be in part obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Figure 1 is a perspective view of a shoe, as a galosh, embodying the fastener as a side closing device, Fig. 2 is an enlarged detail view of the fastener as viewed on the same side as that appearing in Fig. 1, Fig. 3 is a view similar to Fig. 2 but viewed from the inside, the cloth body being omitted, Fig. 4 is a detail of the lower portion of the fastener of Fig. 3, but illustrating the fastener members in an open position, Fig. 5 is a cross-section on the line 5—5 of Fig. 2, Fig. 6 is a plan view illustrating the fastener of the other figures as applied to a bag or pouch such as a tobacco pouch, Fig. 7 diagrammatically illustrates a modified form of the spring fastener members.

Fig. 8 illustrates a vertical section through the ring or slide, and

Fig. 9 illustrates the fastener applied to a pouch in a slightly different way from that shown in Fig. 6.

Referring now more specifically to the drawing, in the embodiments illustrated a pair of fastening members 1 and 2 is employed. Each member has a series of teeth resiliently connected in a series longitudinally of the member. The teeth extend transversely of the slit or opening for which the fastener is used, and the teeth of each fastener member are adapted to be received between and held by the teeth of the other fastener member when the fastener is closed. In the specific embodiments illustrated, each fastener member includes a helical spring, such as is clearly illustrated. The numerals 3 and 4 indicate portions of a body member to which the fastener members 1 and 2 are connected. In the embodiment illustrated the opposite edges of the closure opening, or slit, in the body member are indicated in Fig. 2 by the dot and dash lines 5 and 6, these lines representing the edges of the parts 3 and 4 and forming opposite edges of the closure opening. Specifically, the material of the body member or upper of the shoe illustrated in Fig. 1 may be slit from its upper edge 7 down to the point 8, so as to provide the members 3 and 4, the edges of which may be brought together or separated as is well understood. The turns of the springs run transversely to the lines of the edges 5 and 6, and in the embodiment illustrated these turns provide loops or loop portions which pass through the body members 3 and 4 respectively, for connecting the fastener members thereto. In Fig. 5 the turns are illustrated as looping through the body members 3 and 4 close to the edges of the latter, and the turns of the springs are also illustrated as in interengagement with each other as would be the case when the fastener is closed as illustrated in Figs. 2 and 3.

When the fastener is closed the longitudinal axes of the helical springs are parallel for the greater portion of their length and the turns of one spring interengage with those of the other with resilient gripping, or pressure, effect, as is clearly illustrated. Referring to Fig. 4, the turns of the fastener member, or spring, 1 on the side 10 which faces the side 9 of the other spring 2, are spaced from each other so as to receive the turns of the spring 2 with resilient gripping effect. Relatively closely coiled helical springs of brass or other suitable material may be used, the turns of each spring providing transverse teeth for the interengagement referred to. In the embodiment illustrated the spacing between the turns of one spring, as on the side 10, Fig. 4, is less than the diameter of the wire of the other spring on the side 9 in the same figure and the pitch of the spring 1 is opposite to that of the spring 2. The angle of pitch is illustrated as the same in each spring, but it is to be understood that the pitch of one spring may be at an angle different from that of the other. To provide a spring suitable for a fastener of the character herein referred to it may be made from a wire the diameter of which is greater than the space between its turns so that when the turns of two of such springs are transversely interengaged they will grip each other with resilient effect.

In the embodiment illustrated means are provided to hold the springs in such relation to each other that fastening pressure progressively applied longitudinally of the series of teeth, or turns, is adapted to cause the teeth of one spring to engage between the teeth of the other with resilient gripping effect longitudinally of the springs. In the present embodiment the two springs are so held by the body member, and the springs are so connected as to resist elongation thereof consequent on interengagement of their teeth in the operation of closing the fastener. In the present embodiment the material of the body member is of substantially non-extensible character, such as cloth, leather, and the like, and is preferably of flexible fabric. The turns of the springs thread through this fabric, being thereby connected thereto at numerous points, so that the fabric tends to resist elongation of the springs. Consequently when the turns of the springs are pressed into engagement with each other in the operation of closing the fastener, the space between the turns of each spring is increased due to engagement by those of the other spring, with the result that along the longitudinal line of the series of engagements each spring is slightly elongated. But it will be observed that the turns of the springs are also secured to the practically non-extensible body members, as for instance at the points indicated at 11 and 11' Fig. 5, so that increased spacing, or displacement, of the turns is resisted when they are connected to the body members, with the result that there is a reactive effect, the body members cooperating to increase the longitudinal pressure effect between engaged turns. Thus with the arrangement described, the pressure or gripping effect between the turns may exceed that which would occur between the turns of similarly related springs of unrestrained elongatability. In this wise the gripping effect between the turns may be augmented beyond that of the gripping effect caused by the resiliency of the springs alone.

In the embodiment illustrated means are provided to interlock the springs with each other so as to hold them from longitudinal displacement relative to each other and to hold the series of teeth, or turns, of the two springs in relative position to interengage on closing the fastener. To this end in the present embodiment advantage is taken of the shape of the springs themselves, certain of the turns of one spring being held normally in interengaged relation to turns of the other spring, as for instance at one end of the opening provided by the body members 3 and 4, as indicated at the point 12, Fig. 2, which generally corresponds to the point 8, Fig. 1. At the point 12 certain of the turns of the two springs are permanently locked in interengaged relation, being first brought into interengaged relation as illustrated in Fig. 2, whereupon a pin 13 is passed between the interengaged turns to hold them against disengagement at this end of the fastener. This pin may be held in place by the tension exerted thereon by the turns, or may also be secured to the body member in any suitable manner as by a staple 14.

The construction and operation of the fastener will be clear from the foregoing but may be briefly described as for instance in connection with its application to a galosh, as illustrated in Fig. 1. Assuming the fastener members or springs being in the relative position indicated in Fig. 4, the slit or side opening in the galosh would be open so that the upper of the galosh may be expanded to receive the foot. The numeral 16 indicates foldable material on the interior of the upper, this material lying directly opposite the fastener and so disposed as to provide a watertight upper. The line of juncture of the material 16 with the shoe is roughly illustrated by the dotted line 17. Having donned the shoe the fastener members may be pressed together by hand and the turns or teeth of the springs caused to interengage with each other with resilient gripping effect with the result that the fastener will be held closed. When the springs are circular or rounded in outline as illustrated in the present embodiment, a relatively narrow longitudinal strip thereof will appear on exterior view of the galosh and will not detract from the appearance of this article of apparel. If sufficient strength is exerted the interengaged springs may be parted from each other by drawing the body members 3 and 4 laterally. It will be observed however that in the galosh the fastener is of considerable length and the longitudinal axes of the springs when closed normally have a curved part especially where the fastener approaches or crosses the instep. The foot and leg portion of the wearer will tend to prevent increasing the angle of curvature referred to, so that there will be but little tendency to increase the degree of said curvature in use and hence but little tendency to decrease the resilient gripping effect which might be consequent upon the increased degree of curvature. However, by inserting the finger inside the galosh and pressing outwardly against the fastener in a direction tending to lessen the degree of curvature, the fastener may readily be opened.

In the embodiment illustrated the fastener is provided with a member or slide adapted by progressive movement in one direction longitudinally of the springs to close the fastener and by similar movement in the opposite direction to open the fastener. This member may consist of a mutilated ring or ringlike member 18 which partially but not entirely surrounds both springs and preferably rides thereon in its movement in opposite directions. In Figs. 2 and 3, the ring 18 is illustrated in the position to which it has been moved from the position shown in Fig. 4 to close the fastener. This member 18 has a wall 19 which extends across both springs and it has inturned lips 20 which cooperated with the wall 19 to embrace the two springs, the internal diameter of the end opening 21 in the ringlike member thus provided being less than the added diameters of the springs. It will be seen that when such member is slid from the position shown in Fig. 4 to that shown in Figs. 2 and 3, the turns of the springs 1 and 2 will progressively be brought into interengagement so as to close the fastener. For opening the fastener the ringlike member is moved in the opposite direction and is provided with a parting finger 22 so disposed as to move between the springs and press them out of engagement with each other. In the form of ringlike member illustrated the spring parting finger 22 is an integral part of the ringlike member, and may be made by bending the metal of said member so as to provide the downwardly projecting finger 22 in proper position. In addition to bending or indenting the member as indicated at 23 to provide said parting finger further lips 24 may be provided to partially enclose the respective springs. The main ring or ring portion of the member 18 is that which provides the opening 21 which operates to close the fastener. The parting finger 22 is longitudinally spaced from the opening 21 so as to follow after the main ring portion when the slide is moved in a fastener opening direction. In the specific embodiment illustrated the parting finger 22 is so shaped as to provide spring deflecting walls 25 and 26 which diverge from each other in directions away from the main ring or opening 21. In the galosh type of fastener the slide is applied to the fastener interiorly of the body of the galosh and does not detract from the appearance of the galosh. For convenience of manipulation the slide 18 may be provided with a manipulative finger as for instance a pivoted ring 27 exteriorly projecting from the fastener for the convenient grasp of the operator. It is clearly to be understood that the fastener is utilizable without the presence of the ringlike member 18. When this member is employed however, it will be noted that when the fastener is closed, said member coacts with the pin 13 to lock one or more turns of one spring in interengagement with turns of the other spring both at the point 12 and at the resting point of the member 18. That is to say one or more turns of one spring is positively locked in interengagement with turns of the other spring at a plurality of different points in the length of the fastener. Between these points interengaged turns of the springs are transversely movable in directions adapted to effect their disengagement, so that the springs are not locked positively in interengaged relation throughout their length but only for a portion of the length of the spring.

In Fig. 6 the fastener herein described is illustrated as applied to the mouth of a tobacco pouch composed of flexible material 30. Although the ringlike member and the parting finger above referred to are illustrated as applied for opening and closing the fastener of the pouch, it is to be understood that in some aspects the invention contemplates the omission of the ringlike member and finger, in which case the springs may be interlocked at both ends of the fastener in a manner indicated at the left end of Fig. 6.

In each form illustrated it will be observed that the fastener is resilient and flexible transversely in all directions and readily accommodates itself to flexible articles and to different shapes of articles whether said shapes be relatively permanent or occasioned by folding or use of the article. The fastener members are, as it were, flexible in all directions in which the body material of the article is flexible. When the longitudinal contour of the edges of the opening in the article is curved or otherwise departs from a straight line, the longitudinal axes of the springs generally conform thereto and in manufacture may be initially shaped as by being set in a permanent curve or otherwise to conform thereto. In this wise the gripping or pressure effect between interengaged turns, as hereinbefore explained, pertains to the fastener of the particular shape, there being no tendency for the fastener to depart from this shape unless force is purposely applied.

In the form illustrated in Fig. 9 the fastener members, instead of having the overlying pouch material as illustrated in Fig. 6, are threaded through the edges of the pouch material and the springs are presented mainly outside and above the edges. Thus these springs are prominently in position to be readily pressed into engagement together with each other by the fingers of the operator. The pouch of Fig. 9 may be composed of two layers of leather, cloth or the like stitched at the side edges as indicated at 31 and 32. In this embodiment the spring fastener members 1 and 2 stop short of said sides, and the upper edges of the layers of cloth may be stitched as indicated at 33 and 34 so as to partially close the mouth of the pouch at such sides. As in the other modifications referred to pins 35 having similar function as the pins 13, may be used to positively lock certain end turns of the springs in engagement with each other. With the construction of Fig. 9, two such pins would be employed one at each side of the pouch.

When the helical fastener members have their turns interengaged as explained in the foregoing, the pressure effect developed between the interengaged turns of the two springs is sufficient to retain the fastener closed. Furthermore it will be observed that on account of the pitch of the interengaged springs the relative position of the interengaged turns is such as to offer resistance to disengagement. Should it be desired to increase the resistance to disengagement, the adjacent sides of the springs may be provided with lugs, knobs or the like, for instance as illustrated in Fig. 7 wherein the wire of each spring is increased in thickness on the sides 40 and 41 which correspond generally to the sides 9 and 10 of Fig. 4. These parts of increased thickness may be rounded so as to facilitate the springs moving to and from closed interengaged relation with each other.

Since certain changes may be in the article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A fastener of the character described including, in combination, a pair of helical springs forming opposite edges of a closure opening, the turns of said springs running transversely to the lines of said edges, the turns of each of said springs on the sides facing each other being spaced from each other, said spaced distance in each spring being less than the diameter of the engaging parts of the wire of the other spring so as to receive the turns of the latter with resilient gripping effect, certain of the turns of one spring being in interengaged relation to turns of the other spring, and means adapted to lock said turns in interengaged relation for a portion only of the length of said springs.

2. A fastener of the character described including, in combination, a pair of helical springs forming opposite edges of a closure opening, the turns of said springs running transversely to the lines of said edges, the turns of each of said springs on the side adapted to engage the other spring being spaced from each other, the spacing between turns of one spring on said side being less than the diameter of the wire of the other spring on said side, the pitch of one of said springs being at an angle opposite to that of the other spring, certain of the turns of one spring being permanently locked in interengaged relation to turns of the other spring.

3. A fastener of the character described including, in combination, a pair of helical springs forming opposite edges of a closure opening, the turns of said springs running transversely to the lines of said edges, the turns of each of said springs on the side adapted to engage the other spring being spaced from each other, the spacing between turns of one spring on said side being less than the diameter of the wire of the other spring on said side, and flexible body members of material adapted to resist elongation of said springs, the turns of said springs passing through said body members for securement thereto and so that the body members resist displacement of said turns relative to each other longitudinally of the springs, certain of the turns of one spring being interengaged with and locked against disengagement from turns of the other spring at one end of the fastener.

4. A fastener of the character described including, in combination, a pair of helical springs forming opposite edges of a closure opening, the turns of said springs running transversely to the lines of said edges, the turns of each of said springs on the side adapted to engage the other spring being spaced from each other, the spacing between turns of one spring on said side being less than the diameter of the wire of the other spring on said side, and flexible body members of material adapted to resist elongation of said springs, the turns of said springs passing through said body members for securement thereto and so that the body members resist displacement of said turns relative to each other longitudinally of the springs, certain of the turns of one spring being interengaged with and locked against disengagement from turns of the other spring at one end of the fastener, the pitch of one of said springs being opposite to that of the other.

5. A fastener of the character described including, in combination, a pair of helical springs forming opposite edges of a closure opening, the turns of said springs running transversely to the lines of said edges, the turns of each of said springs on the sides facing each other being spaced from each other, said spaced distance in each spring being such as to receive the turns of the other spring with resilient gripping effect, a reciprocal mutilated ring partially but not entirely surrounding both said springs, the internal diameter of said ring being less than the added diameters of said springs, said ring adapted by progressive movement longitudinally of said springs in one direction, to close the fastener, and a spring-parting finger attached to said ring movable between said springs when said ring is moved in the opposite direction.

6. A fastener of the character described including, in combination, a pair of helical springs forming opposite edges of a closure opening, the turns of said springs running transversely to the lines of said edges, the turns of each of said springs on the sides facing each other being spaced from each other, said spaced distance in each spring being such as to receive the turns of the other spring with resilient gripping effect, a reciprocal mutilated ring partially but not entirely surrounding both said springs, the internal diameter of said ring being less than the added diameters of said springs, said ring adapted by progressive movement longitudinally of said springs in one direction, to close the fastener, and a spring-parting finger attached to said ring movable between said springs when said ring is moved in the opposite direction, said parting-finger including spring deflecting walls diverging from each other in directions away from said ring.

7. A fastener of the character described including, in combination, a pair of helical springs forming opposite edges of a closure opening, the turns of said springs running transversely to the lines of said edges, the turns of each of said springs on the sides facing each other being spaced from each other, said spaced distance in each spring being such as to receive the turns of the other spring with resilient gripping effect, a reciprocal mutilated ring partially but not entirely surrounding both said springs, the internal diameter of said ring being less than the added diameters of said springs, said ring adapted by progressive movement longitudinally of said springs in one direction, to close the fastener, and a spring-parting finger attached to said ring movable between said springs when said ring is moved in the opposite direction, said finger being extended to form a handle disposed on the outside of the fastener.

8. A fastener of the character described including, in combination, a pair of helical springs the longitudinal axes of which are parallel when the fastener is closed, the turns of each of said springs on the sides facing each other being spaced from each other, said spaced distance in each spring being such as to receive the turns of the other spring with resilient gripping effect, and means adapted positively to lock one or more turns of one spring in interengagement with turns of the other spring at a plurality of different points spaced apart in the lengths of said springs, interengaged turns between said spaced points being transversely movable in directions adapted to effect their disengagement.

9. In a fastener device of the character described, in combination, a pair of helical mutually cooperative fastener springs the turns of which are adapted to interengage with each other with resilient gripping effect longitudinally of the springs, the longitudinal axis of each of said springs being in part permanently set in a curve at a part of its length adapted to engage and disengage the other spring.

10. In a fastener device, in combination, a pair of helical fastener springs having their turns when in fastening position engaged with each other, each spring having its adjacent turns spaced apart longitudinally a less distance than the diameter of the wire of the companion spring whereby said springs engage each other with resilient gripping effect longitudinally thereof, the longitudinal axis of each of said springs being in part permanently set in a curve at a part of its active engaging and disengaging length.

ARTHUR HALSEY TROTTER.